(12) United States Patent
Kunishima et al.

(10) Patent No.: US 7,954,880 B2
(45) Date of Patent: Jun. 7, 2011

(54) SLIDING DOOR STRUCTURE FOR AUTOMOBILE

(75) Inventors: Shinichi Kunishima, Chigasaki (JP); Masaya Endo, Kawasaki (JP); Masato Yamamoto, Sagmihara (JP); Yukiko Jinishi, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 205 days.

(21) Appl. No.: 11/927,034

(22) Filed: Oct. 29, 2007

(65) Prior Publication Data

US 2008/0100091 A1  May 1, 2008

(30) Foreign Application Priority Data

Oct. 27, 2006 (JP) .................................. 2006-292639
Aug. 7, 2007 (JP) .................................. 2007-205256

(51) Int. Cl.
*B60J 5/06* (2006.01)
(52) U.S. Cl. ................ 296/155; 296/146.1; 296/146.11; 296/146.12; 292/241
(58) Field of Classification Search ............... 296/146.4, 296/146.9, 146.11, 146.12, 155; 49/502; 292/241, 215, 218, 197, 202, 272, 300
See application file for complete search history.

(56) References Cited

U.S. PATENT DOCUMENTS

| 4,025,104 | A | * | 5/1977 | Grossbach et al. | ............ 296/155 |
| 4,239,268 | A | * | 12/1980 | Rider | ................................ 292/5 |
| 5,967,595 | A | * | 10/1999 | Heya et al. | ..................... 296/155 |
| 5,992,097 | A | * | 11/1999 | Makiuchi et al. | ............... 49/216 |
| 6,183,039 | B1 | * | 2/2001 | Kohut et al. | ................... 296/155 |
| 6,530,619 | B2 | * | 3/2003 | Fukumoto et al. | ............ 296/155 |
| 6,793,268 | B1 | * | 9/2004 | Faubert et al. | ........... 296/146.12 |
| 6,926,342 | B2 | * | 8/2005 | Pommeret et al. | ............ 296/155 |
| 6,971,706 | B2 | * | 12/2005 | Yoshida et al. | ................ 296/155 |

FOREIGN PATENT DOCUMENTS

| DE | 3310961 | 12/1983 |
| DE | 10164345 | 3/2003 |
| DE | 102004022826 | 12/2005 |

(Continued)

OTHER PUBLICATIONS

Espacenet Abstract of Japanese publication No. 2001277855, published Oct. 10, 2001 (1 page).

(Continued)

*Primary Examiner* — Glenn Dayoan
*Assistant Examiner* — SunSurraye Westbrook
(74) *Attorney, Agent, or Firm* — Osha Liang LLP

(57) ABSTRACT

A sliding door structure of a vehicle is provided for sliding a door body with respect to an opening portion of a vehicle body in forward and rearward directions of the vehicle body for opening and closing. The sliding door structure includes a rail disposed on the door body and aligned with the forward and rearward directions of the vehicle body. An arm protrudes from an edge portion on a door opening direction side of the opening portion of the vehicle body, and is configured to engage with the rail to hold the door body movably in the forward and rearward directions. The door body is able to slide in the door opening direction after engagement between the vehicle body side engagement portion and the arm side engagement portion when the arm pushes the door body outwardly in the width direction of the vehicle.

18 Claims, 15 Drawing Sheets

FOREIGN PATENT DOCUMENTS

| | | |
|---|---|---|
| DE | 202005017077 | 3/2007 |
| EP | 1721768 | 11/2006 |
| EP | 1745958 | 1/2007 |
| FR | 2893543 | 5/2007 |
| JP | 2-120225 | 9/1990 |
| JP | 3-100516 | 10/1991 |
| JP | 2001-173294 | 6/2001 |
| JP | 2001-277855 | 10/2001 |
| JP | 2002-137634 | 5/2002 |

OTHER PUBLICATIONS

Espacenet Abstract of Japanese publication No. 2001173294 published Jun. 26, 2001 (1 page).

Espacenet Abstract of Japanese publication No. 2002137634, published May 14, 2002 (1 page).

European Search Report dated Feb. 21, 2008 (9 pages).

* cited by examiner

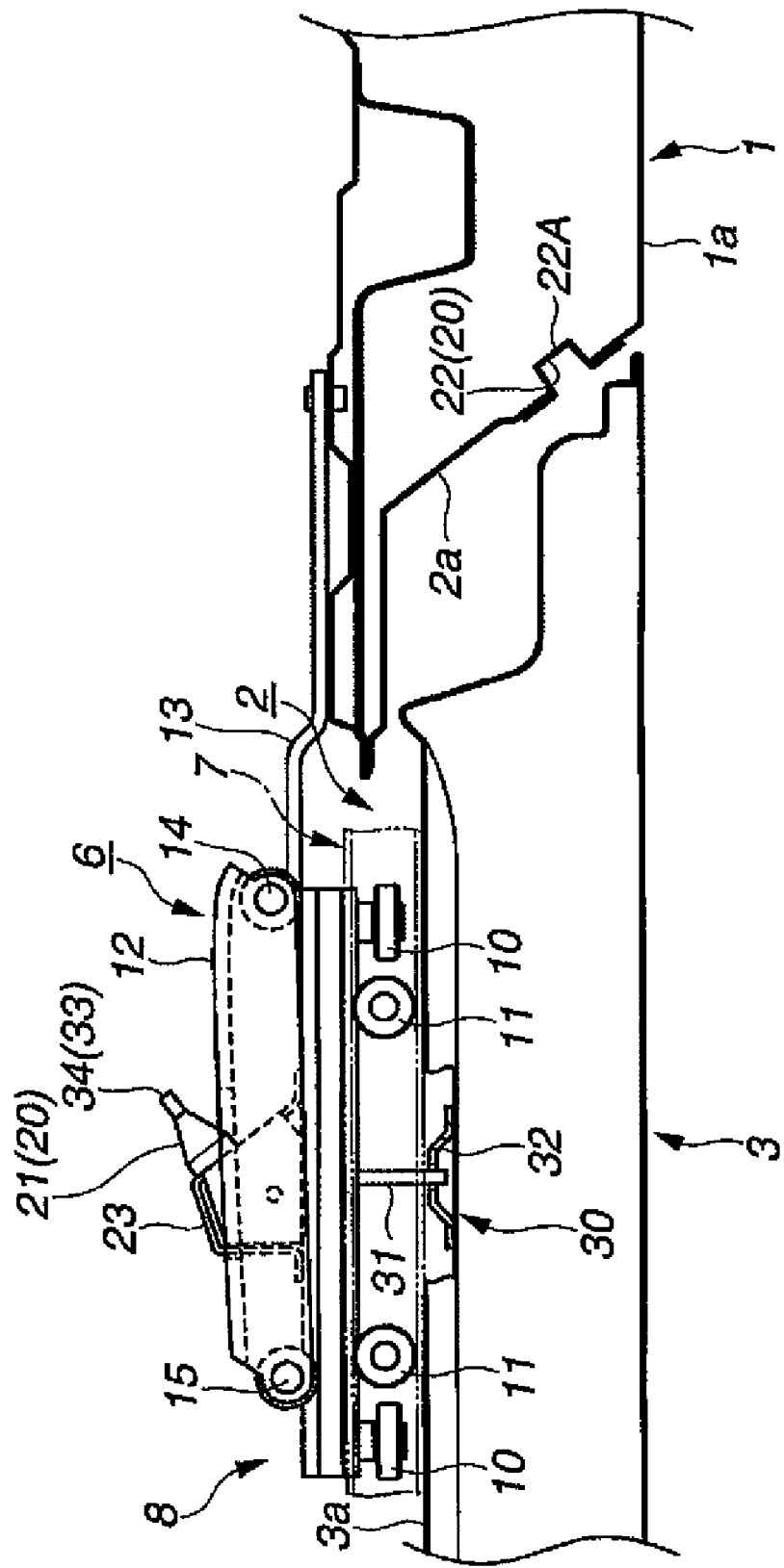

SLIDING DOOR STRUCTURE FOR AUTOMOBILE

PRIORITY APPLICATION

This application claims priority from Japanese Patent Application Nos. 2006-292639, filed Sep. 19, 2006, and 2007-205256, filed Aug. 7, 2007, the contents of which are hereby incorporated by reference in their entireties.

BACKGROUND OF INVENTION

1. Field of the Invention

This invention relates to a sliding door structure for an automobile.

2. Description of the Related Art

In an automobile of a sliding door type, a door body is provided with a rail of a middle guide mechanism configured to guide a middle portion of the door body in upward and downward directions, and the door body is opened and closed by a sliding movement in forward and rearward directions with respect to an opening portion of a vehicle body by this rail and a guide roller disposed on a rear edge portion of the opening portion of the vehicle body. Moreover, at a rear side portion of a rear fender which is an outside plate of the vehicle body, there is provided a support roller configured to be engaged with the rail by moving outwards in a fully open state of the door body, and the guide roller and the support roller support front and rear portions of the door body in the fully open state of the door body. An example of such a door body is disclosed in Japanese Patent Application Publication No. 2002-137634. At the rear side portion of the rear fender, there is provided the support roller configured to be moved for supporting of the rear portion of the door body in the fully open state of the door body. Consequently, the appearance of the rear fender is deteriorated.

SUMMARY OF THE INVENTION

In accordance with embodiments of the present invention, a sliding door structure of a vehicle is provided for sliding a door body with respect to an opening portion of a vehicle body in forward and rearward directions of the vehicle body for opening and closing. The sliding door structure includes a rail disposed on the door body and aligned with the forward and rearward directions of the vehicle body. An arm protrudes from an edge portion on a door opening direction side of the opening portion of the vehicle body, and is configured to engage with the rail to hold the door body movably in the forward and rearward directions. The arm includes an arm side engagement portion configured to engage with a vehicle body side engagement portion disposed proximate to the edge portion of the door opening direction side of the opening portion of the vehicle body. The arm connects between the edge portion on the door opening direction side of the opening portion of the vehicle body and the rail and is configured to rise and fall in a width direction of the vehicle and is configured to push the door body outward beyond an outside plate of the vehicle body at a beginning of the opening of the door body. The door body is able to slide in the door opening direction after engagement between the vehicle body side engagement portion and the arm side engagement portion when the arm pushes the door body outwardly in the width direction of the vehicle.

In accordance with embodiments of the present invention, a sliding door structure of a vehicle is provided for sliding a door body with respect to an opening portion of a vehicle body in forward and rearward directions of the vehicle body for opening and closing. The sliding door structure includes sliding means disposed on the door body and arm connecting means for connecting between the sliding means, wherein the arm connecting means includes an arm side engagement portion configured to engage a vehicle body side engagement portion disposed proximate to an edge portion on a door opening direction side of the opening portion of the vehicle body. The arm connecting means is configured to rise and fall in a width direction of the vehicle and to push the door body outward beyond an outside plate of the vehicle body at a beginning of the opening of the door body. The door body is configured to slide in the door opening direction after engagement between the vehicle body side engagement portion and the arm side engagement portion when the arm pushes the door body outwardly in the width direction of the vehicle.

In accordance with embodiments of the present invention, a method is provided for sliding a door body open with respect to an opening portion of a vehicle body in forward and rearward directions of the vehicle body for opening and closing. The method includes pushing the door body outwardly beyond an outside plate of the vehicle body before allowing sliding of the door body. An arm is connected between a rail on the door body and the vehicle body and is configured to rise and fall in a width direction of the vehicle. The method further includes sliding the door body in an opening direction after the door body is pushed outwardly beyond the outside plate of the vehicle.

Other aspects and advantages of the invention will be apparent from the following description and the appended claims.

BRIEF DESCRIPTION OF DRAWINGS

FIG. 3 is a sectional plan view showing a folded state of an arm in a fully closed state of the door body in accordance with an embodiment of the present invention.

DETAILED DESCRIPTION

Figure 1:
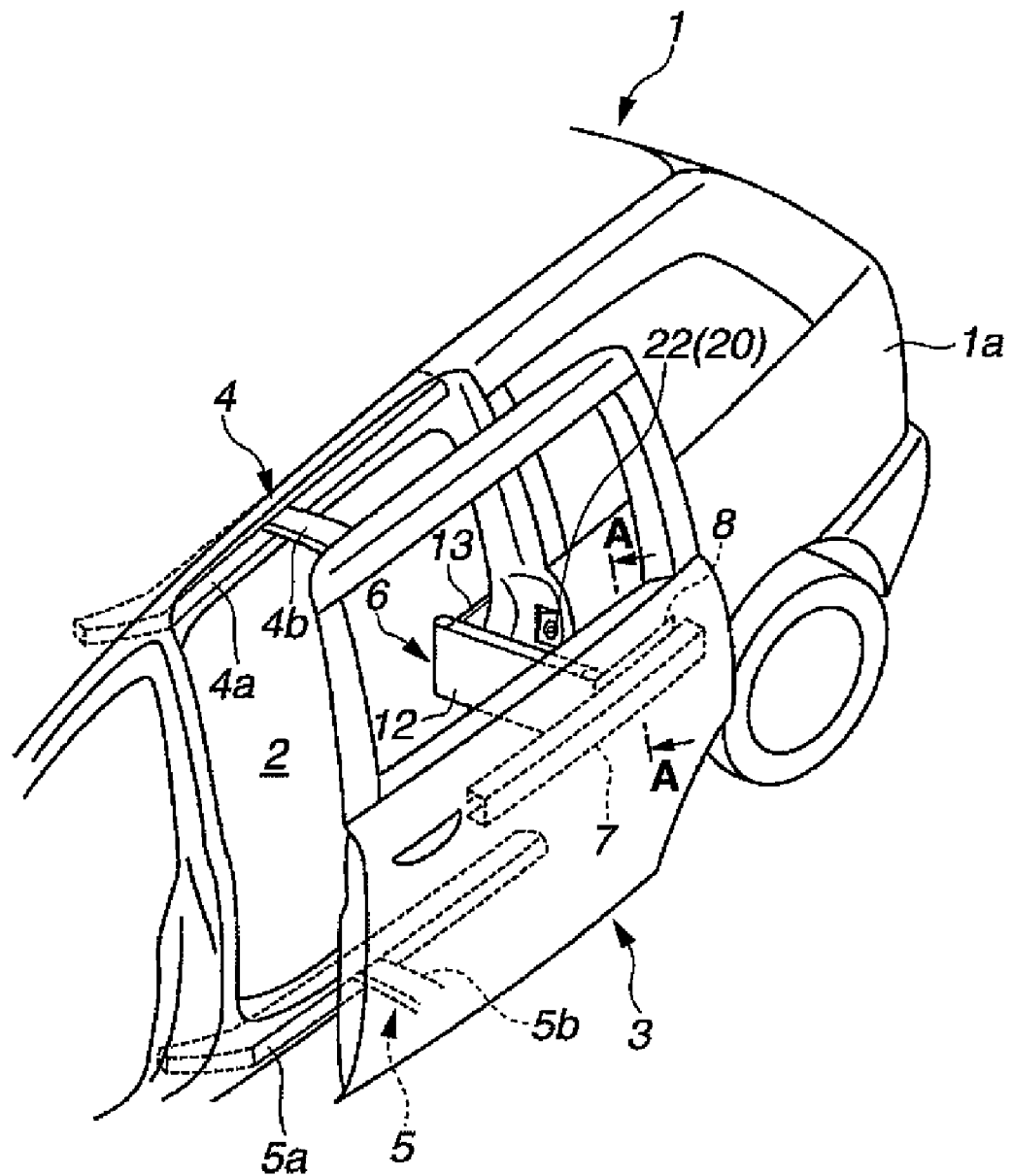
FIG. 1 is a perspective view showing a relationship between an opening portion of a vehicle body and a door body in accordance with an embodiment of the present invention.
Figure 2:
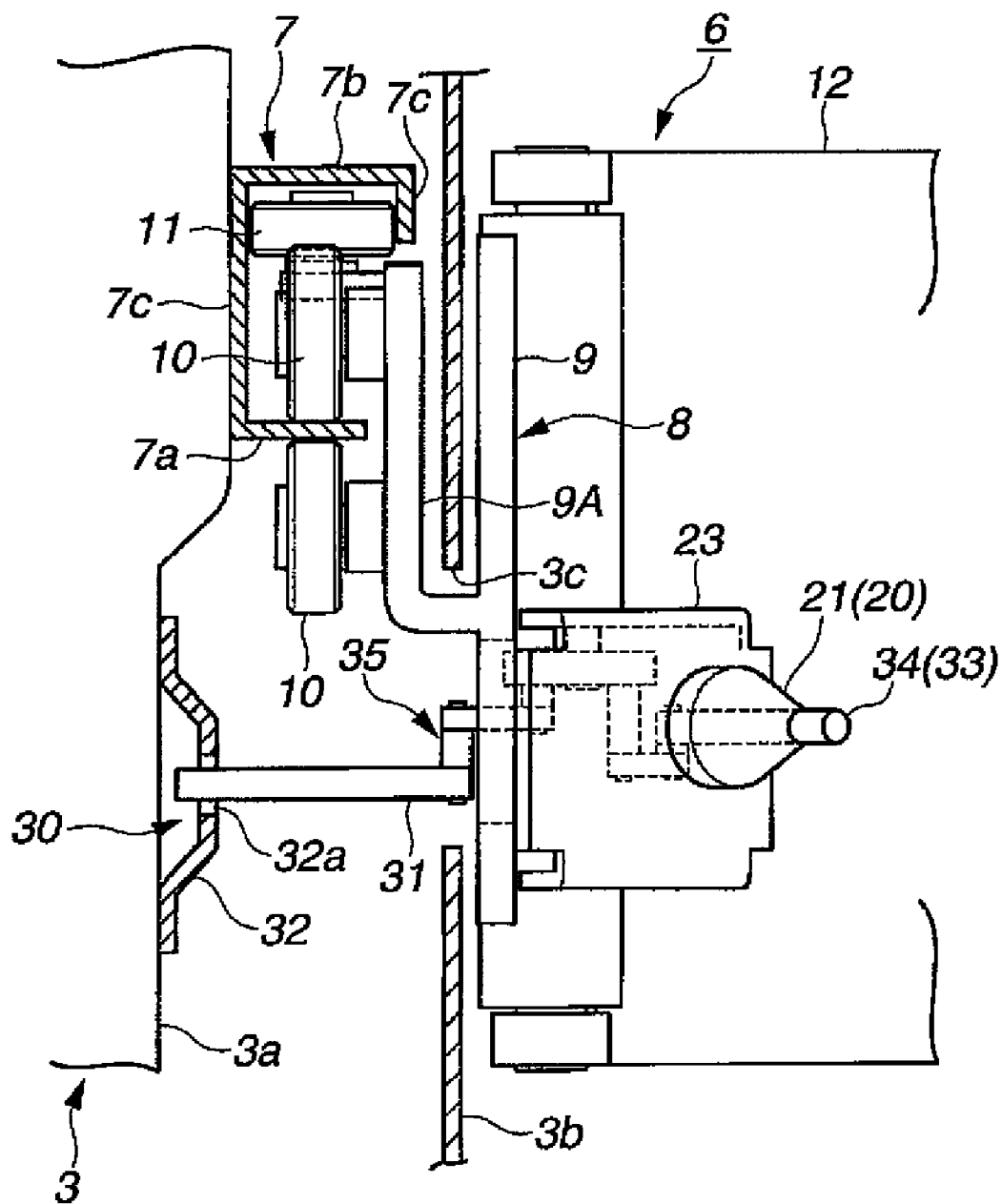
FIG. 2 is an arrow sectional view taken along a line A-A of FIG. 1.

Hereinafter, embodiments of the present invention will be illustrated in detail with reference to the drawings.

The present invention provides a sliding door structure of an automobile which is configured to securely support a central portion of a door body in a fully open state without holding a rear end portion of the door when in the fully open position.

In the sliding door structure of the automobile according to embodiments of the present invention, the sliding door structure of the automobile for sliding the door body with respect to an opening portion of a vehicle body in forward and rearward directions of the vehicle for opening and closing by at least middle guide mechanism configured to guide the door body in the forward and rearward directions, the sliding door structure includes: the middle guide mechanism including a middle rail disposed on a middle portion of the door body of the upward and downward directions in the forward and rearward directions; and a middle arm protruding from an edge portion of the opening portion of the vehicle body which is on a door opening direction side of the forward and rearward directions, the arm being connected and engaged with the middle rail so as to be capable of rising and falling in a width direction of the vehicle, and configured to push the door body outward beyond an outside plate of the vehicle body at a beginning of the opening of the door body, the middle arm including an arm side engagement portion configured to hold the door by engaging with a vehicle body side engagement portion disposed on the edge portion of the opening portion of the vehicle body on the door opening direction side when the middle arm pushes the door body outwardly in the width direction of the vehicle, and the door body being capable of sliding in the door opening direction after the engagement between the vehicle body side engagement portion and the arm side engagement portion.

In the sliding door structure of the automobile according to embodiments of the present invention, when the door body is opened from the fully closed position in the door opening direction, the door body is moved and slid in the rearward direction by the middle guide mechanism. At the beginning of the opening operation of this door body, the door body is moved in the rearward direction, and at the same time, the arm is rotated and risen from the folded state so as to push the door body outward beyond the outside plate of the vehicle body.

Then, the arm side engagement portion disposed on the middle arm and the vehicle side engagement portion disposed on the edge portion of the opening portion of the vehicle body on the door opening direction side are engaged with each other. Consequently, the middle arm is held to the vehicle body, and the rail located on the middle of the vehicle body is slid with respect to the cart in the rearward direction of the vehicle body.

Consequently, at the sliding movement of the door body in the forward and rearward directions, that middle portion in the upward and downward directions is securely supported by the middle arm held on the vehicle body side and the engagement of the engagement portions. Therefore, it is possible to perform the sliding movement of the door body stably, and moreover to ensure the stability of supporting the door body at the fully open position.

In the sliding door structure according to the embodiment shown in FIGS. 1-6, a door body 3 is disposed at an opening portion 2 provided in a side surface portion of a vehicle body 1 as shown in FIG. 1. Door body 3 is configured to be slid with respect to vehicle body opening portion 2 in forward and rearward directions to open and close vehicle body opening portion 2. In the embodiment shown in FIG. 1, the opening direction of the door body is in the rearward direction. Those having ordinary skill in the art will appreciate that the sliding door structure may be reversed in order to provide the opening direction of the door body in the forward direction without departing from the scope of the present disclosure.

This door body 3 includes an upper guide mechanism 4 configured to guide an upper portion thereof in the forward and rearward directions, a lower guide mechanism 5 configured to guide a lower portion in the forward and rearward directions, and a middle guide mechanism 6 configured to guide a middle portion in upward and downward directions in the forward and rearward directions. Door body 3 is slid with respect to vehicle body opening portion 2 in the forward and rearward directions by these guide mechanisms 4-6, so as to be opened and closed, as mentioned above.

Upper guide mechanism 4 and lower guide mechanism 5 include, respectively, upper and lower rails 4a and 5a disposed along an upper edge portion and a lower edge portion of vehicle body opening portion 2 in the forward and rearward directions. Upper and lower guide arms 4b and 5b are disposed at forward end portions of door body 3 at upper and lower positions to protrude inwardly in a vehicle width direction, and provided at respective ends with rollers configured to engage with upper and lower rails 4a and 5a.

Forward end portions of upper and lower rails 4a and 5a are formed, respectively, to be bent inwardly in the vehicle width direction, and receive upper and lower guide arms 4b and 5b inwardly in the vehicle width direction when door body 3 is fully closed, so that an outer surface of door body 3 is aligned with the side surface of the vehicle body. When door body 3 is slid along general portions of upper and lower rails 4a and 5a, door body 3 is separated apart outwardly from a rear fender 1a which is an outer plate of the vehicle body, in accordance with lengths of protrusions of upper and lower guide arms 4b and 5b.

Middle guide mechanism 6 includes a middle rail 7 formed into a substantially channel shaped section, and disposed between an inner panel 3a and a door trim 3b of door body 3 in the forward and rearward directions; a middle arm 12 configured to push door body 3 outward from rear fender 1a at the beginning of the opening of door body 3; and a cart 8 forming a part of middle arm 12, cart 8 being engaged with middle rail 7 so that middle rail 7 can be relatively moved in the forward and rearward directions. Those having ordinary skill in the art will appreciate that other rail shapes may be used without departing from the scope of the present invention.

Cart 8 is provided with a plate-shaped base plate 9 formed to have a required length in the forward and rearward directions. Base plate 9 is provided with a sub plate 9A disposed on a back side of door trim 3b through a slit 3c formed in door trim 3b in the forward and rearward directions.

At forward and rearward end portions of sub plate 9A, there are provided a pair of upper and lower longitudinal guide rollers 10 engaged with middle rail 7 to sandwich a lower wall 7a of middle rail 7; and horizontal guide rollers 11 disposed on be offset from longitudinal guide roller 10 in the forward and rearward directions, engaged with left and right side walls 7c and 7c with a clearance in the vicinity of an upper wall 7b of middle rail 7, and configured to abut and roll on one of side walls 7c at the sliding movement of door body 3 so as to limit horizontal oscillation of door body 3.

Middle arm 12 has one end connected rotatably in the forward and rearward directions, by a pin 14, with a forward end portion of a bracket 13 fixed at the rear edge portion of vehicle body opening portion 2. The other end of the middle arm 12 is connected rotatably in the forward and rearward directions, by a pin 15, with a forward end portion of cart 8, as shown in FIG. 3.

Figure 4A:
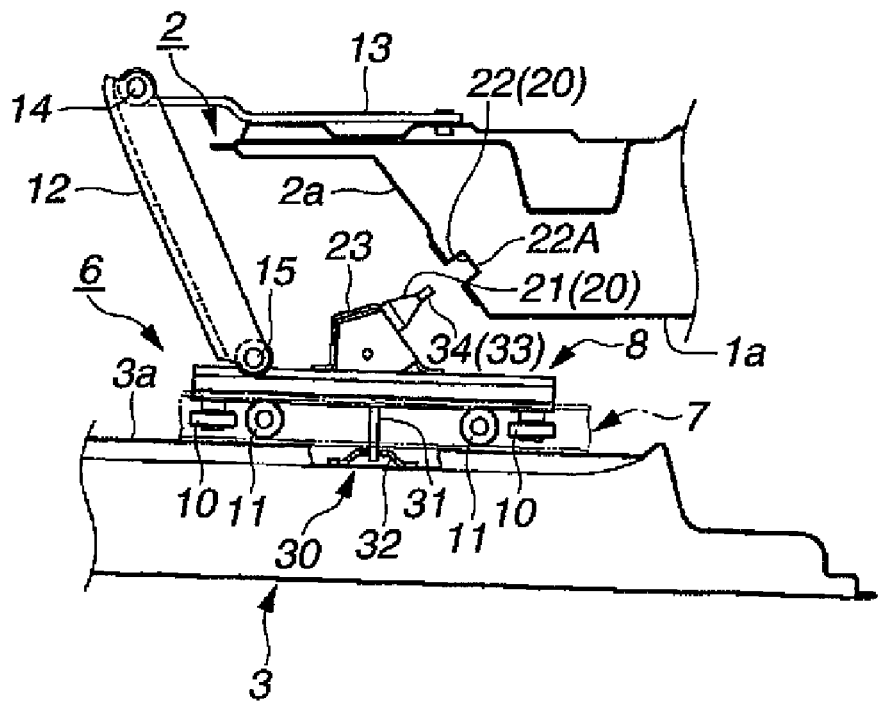
FIGS. 4A and 4B are sectional plan views illustrating a movement of the arm shown in FIG. 3.

This middle arm 12 has a required length to push door body 3 outwards beyond rear fender 1a when middle arm 12 is rotated about pin 14 and risen at the opening of door body 3, as shown in FIGS. 4A and B. In this embodiment, middle arm 12 has a substantially rectangular side surface.

Figure 4B:
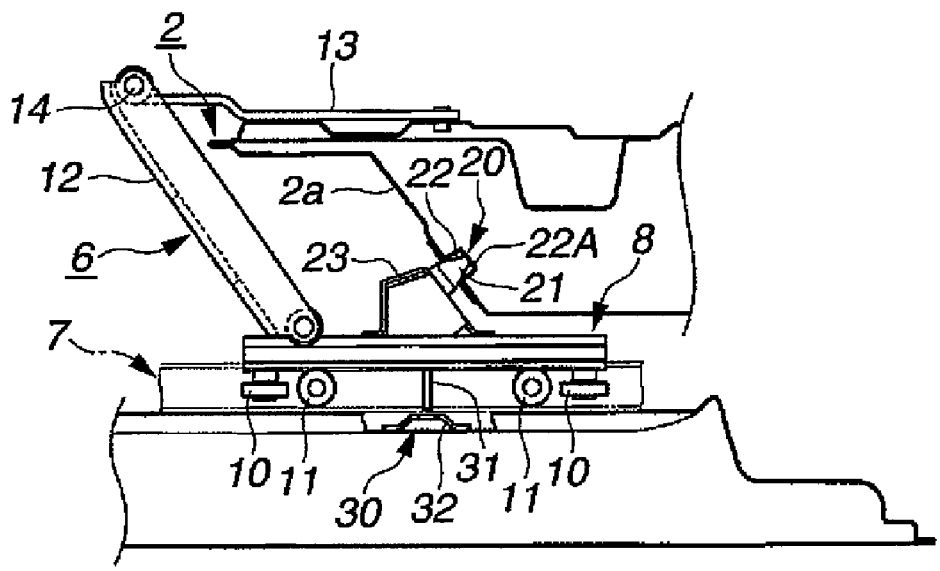

Accordingly, in a state in which door body 3 is in the fully closed position and the middle arm 12 is folded substantially parallel with inner panel 3a of door body 3 as shown in FIG. 3, cart 8 connected with middle arm 12 is positioned at a rear end portion of middle rail 7 of door body 3. When middle arm 12 is rotated and risen about a connection point (pin 14) with bracket 13 at the beginning of the opening of door body 3, the rear end portion of door body 3 is pushed outwards as shown in FIG. 4.

On cart 8 and the rear edge portion of vehicle body opening portion 2, there is an engagement means 20 configured to hold cart 8 to vehicle body 1 by engagement with each other when middle arm 12 pushes the rear end portion of door body 3 outwards in the vehicle width direction.

In this embodiment, engagement means 20 includes a protruding member 21 disposed on cart 8 as an arm side engagement portion, and a recessed portion 22 disposed on the rear edge portion of vehicle body opening portion 2 as a vehicle body side engagement portion, and configured to be engaged with protruding member 21.

Recessed portion 22 includes a recessed perforation member 22A disposed and connected to penetrate through a longitudinal wall 2a formed to be inclined outwardly in the rearward direction at the rear edge portion of vehicle body opening portion 2.

On the other hand, protruding member 21 is formed into a conical shape by relatively hard rubber or synthetic resin and so on. Protruding member 21 is penetrated through and fixed to a rear surface of box-shaped bracket 23 disposed and joined to cart 8 which is formed at the same inclination angle as rear edge longitudinal wall 2a of vehicle body opening portion 2.

Figure 7:
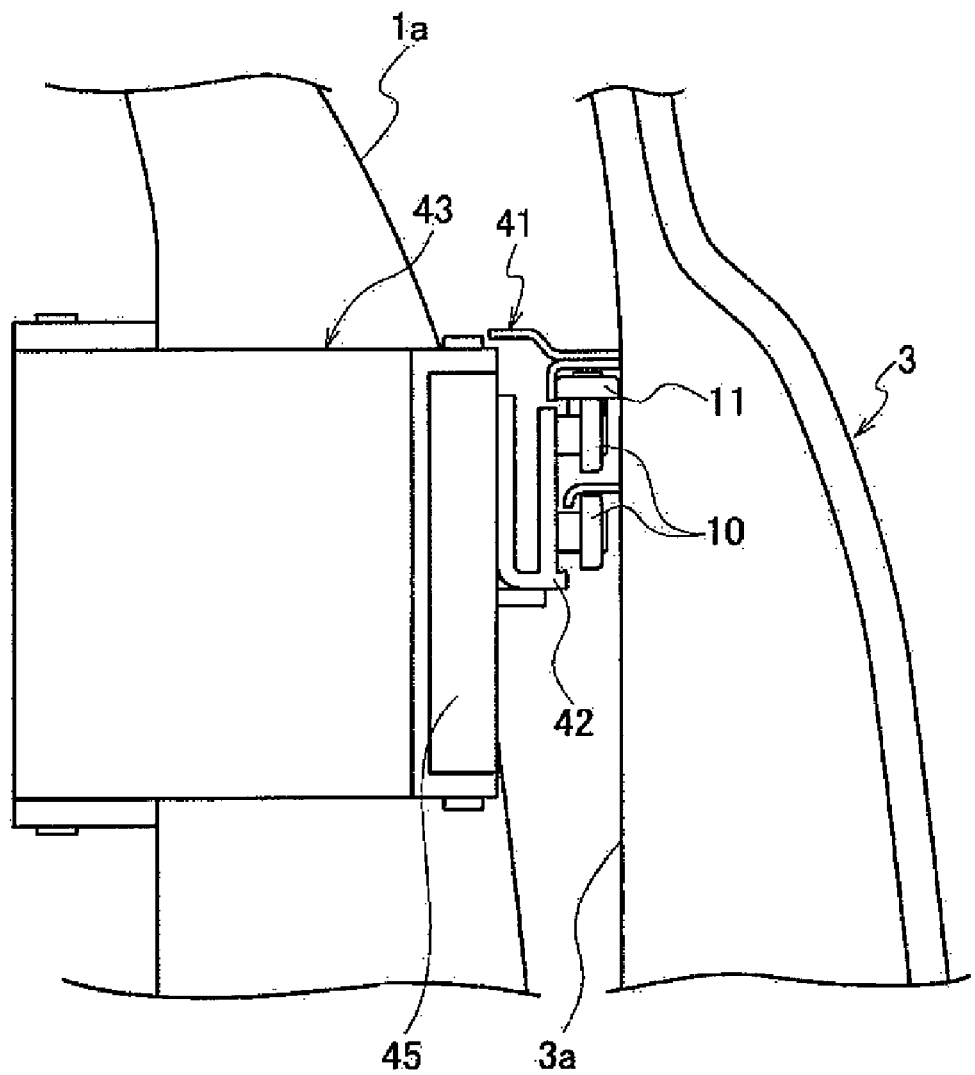
FIG. 7 is a front view of a sliding door structure in accordance with an embodiment of the present invention.

As mentioned above, middle arm 12 is folded to be adjacent to cart 8 in the fully closed state of door body 3. Accordingly, protruding member 21 is provided at a position out of arm 12 in the upward and rearward directions. Preferably, protruding member 21 is provided within a projected side surface of arm 12 at the central portion of cart 8, and arm 12 is formed at central portion thereof, with an escape hole for protruding member 21. Moreover, the width of middle arm 12 in the height direction of the vehicle is larger than that of vehicle body side engagement portion, as shown in FIG. 7. The middle arm 12 is provided at a position to hide recessed portion 22 to be overlapped in the height direction of the vehicle.

Figure 5:
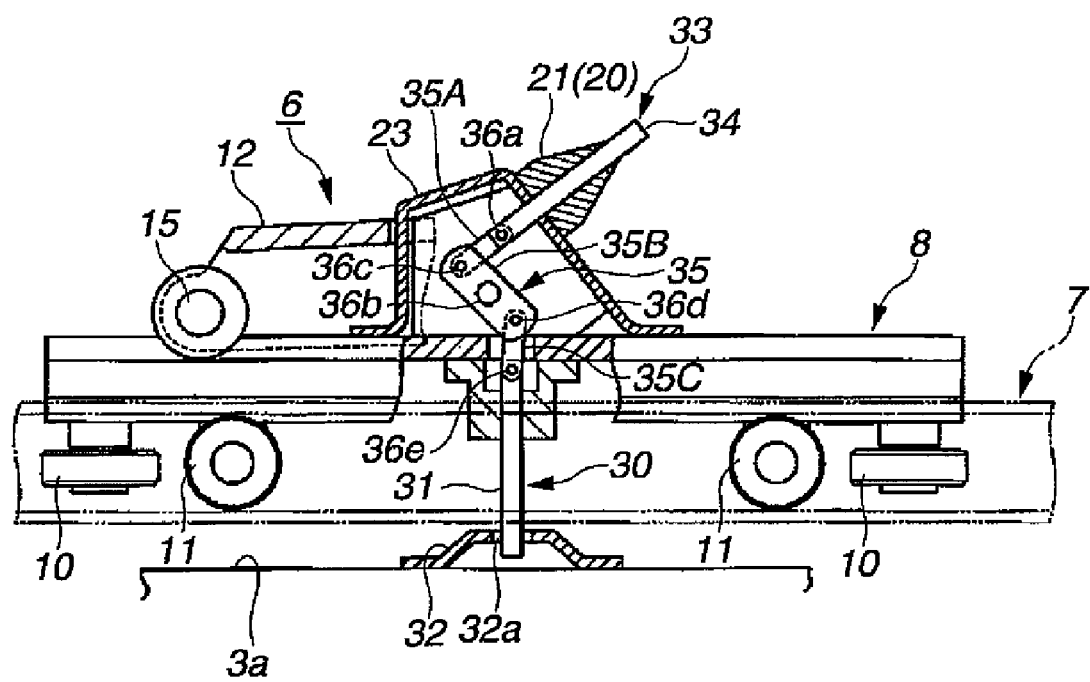
FIG. 5 is a sectional plan view showing a lock mechanism in accordance with an embodiment of the present invention.
Figure 6:
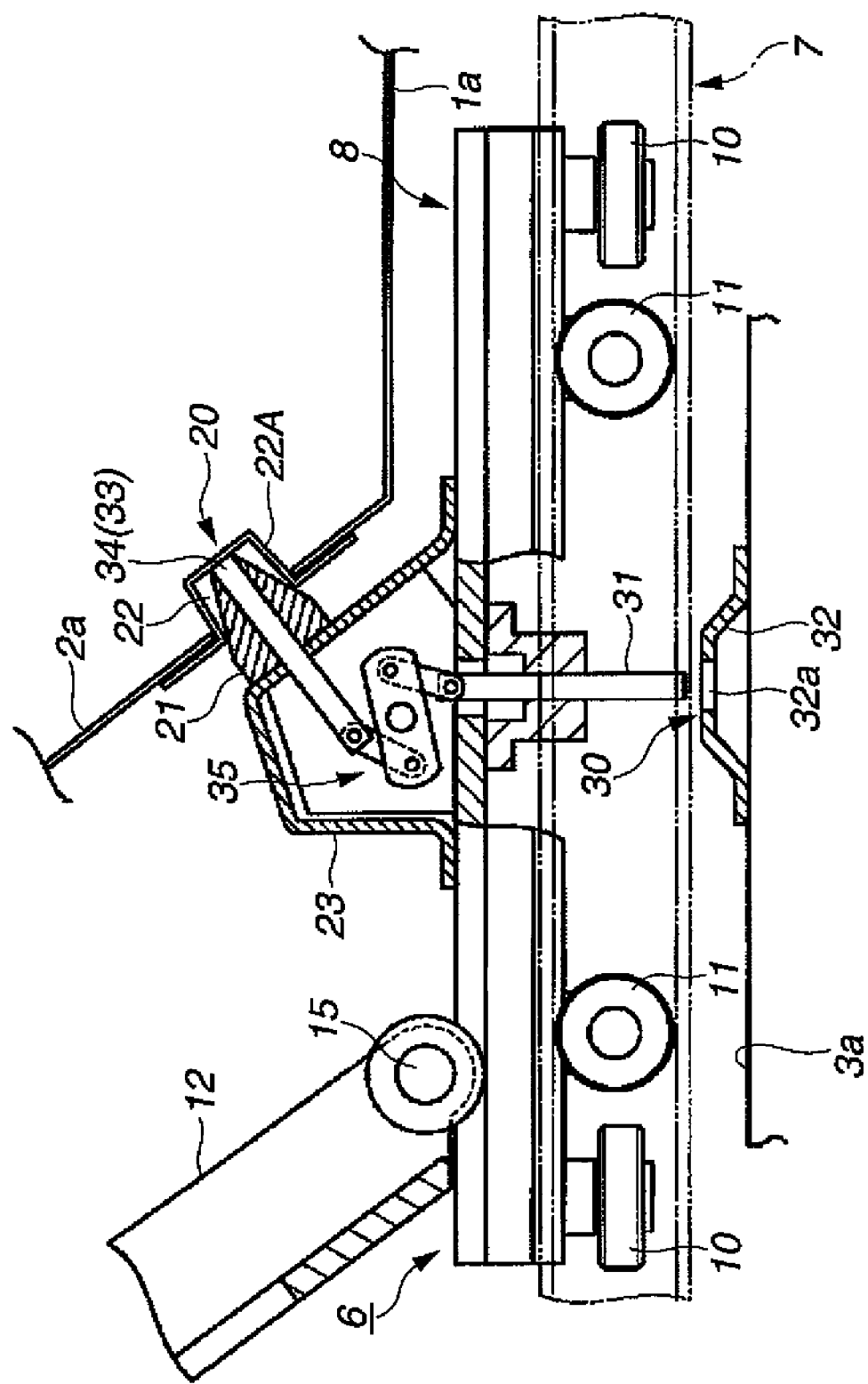
FIG. 6 is a sectional plan view showing a movement of a lock mechanism at a lock releasing operation in accordance with an embodiment of the present invention.

Cart 8 may be provided with a lock mechanism 30 configured to lock cart 8 to door body 3 when door body 3 is in the fully closed state, as shown in FIGS. 5 and 6, and configured to release the lock between cart 8 and door body 3 on the basis of a sensing operation of a sensing means 33 when protruding member 21 is engaged with recessed portion 22 at the opening of door body 3.

In this embodiment, lock mechanism 30 includes a lock pin 31 disposed on be configured to advance and retreat in the vehicle width direction by penetrating through cart 8. A striker 32 is fixed to inner panel 3a of door body 3. The striker 32 includes a lock hole 32a configured to be engaged and disengaged with an end portion of lock pin 31.

In the present embodiment, sensing means 33 includes an engagement sensing pin 34 disposed to penetrate through a central portion of protruding member 21 to advance and retreat from that end, and configured to retreat by abutting on a bottomed portion of recessed portion 22 at the engagement between protruding member 21 and recessed portion 22. A link mechanism 35 is configured to change the advance and retreat movements of engagement sensing pin 34 to the advance and retreat movements of lock pin 31.

Link mechanism 35 includes a first link 35A having one end rotatably connected with a rear end portion of engagement sensing pin 34 by a pin 36a within box-shaped bracket 23; a second link 35B having a central portion in a longitudinal direction which is rotatably connected with a side wall of bracket 23 by a pin 36b, and one end rotatably connected with the other end of first link 35A by a pin 36c; and a third link 35C having one end rotatably connected with the other end of second link 35B by a pin 36d, and the other end rotatably connected with the rear end of lock pin 31 by a pin 36e.

In a case in which lock mechanism 30 includes lock pin 31 and striker 32, and moreover sensing means 33 includes engagement sensing pin 34 and link mechanism 35 like this embodiment, spring members may be used for urging lock pin 31 in the lock direction and for urging engagement sensing pin 34 in the advance direction, in a normal state.

In the sliding door structure according to the embodiment as described above, in the case in which door body 3 is opened from the fully closed position shown in FIG. 3 in the rearward direction of the vehicle body, door body 3 is slid in the rearward direction along upper and lower rails 4a and 5a of upper guide mechanism 4 and lower guide mechanism 5. At the beginning of the opening operation of door body 3, door body 3 is moved in the rearward direction, and at the same time, middle arm 12 is rotated and risen, from the folded state, about the connection point (pin 14) with bracket 13 of the vehicle body, as shown in FIG. 4A. Consequently, the rear end portion of door body 3 is pushed outside rear fender 1a.

In this case, engagement protrusion 21 disposed on cart 8 is inserted into and engaged with recessed portion 22 disposed on the rear edge portion of vehicle body opening portion 2, so that cart 8 is held by vehicle body 1. Consequently, middle rail 7 of door body 3 is slid with respect to cart 8 in the rearward direction of the vehicle body by rolling longitudinal guide roller 10 and horizontal guide roller 11.

Consequently, in the case of the sliding movement of door body 3 in the forward and rearward directions, the middle portion of cart 8 in the upward and downward directions is connected and held through engagement means 20 to vehicle body 1, and consequently door body 3 is tightly supported through middle rail 7 of door body 3 by held cart 8 within a range of a required length of cart 8 in the forward and rearward directions. Accordingly, it is possible to perform the sliding movement of door body 3 stably, and to ensure the stability of supporting door body 3.

In this way, it is possible to ensure the stability of supporting the fully opening state of door body 3 by cart 8. Accordingly, it is not necessary to provide a supporting roller for holding the fully open state, and consequently the appearance of rear fender 1a is not deteriorated.

In the present embodiment, engagement means 20 for connecting and holding cart 8 to vehicle body 1 includes protruding member 21 disposed on cart 8, recessed portion 22 disposed on the rear edge portion of vehicle body opening portion 2. Accordingly, it is possible to surely connect cart 8 to vehicle body 1 by insertion and engagement of protruding member 21 to recessed portion 22. Moreover, it is possible to improve the stability of supporting door body 3, to simplify the structure, and to facilitate the design.

In one embodiment, cart 8 includes lock mechanism 30 configured to lock cart 8 to door body 3 in the fully closed state of door body 3, and configured to be released on the basis of the sensing operation by sensing means 33 when protruding member 21 is engaged with recessed portion 22 at the beginning of the opening operation. Accordingly, cart 8 can be integrally held to door body 3 until protruding member 21 and recessed portion 22 are engaged with each other. Therefore, it is possible to surely perform the engagement between protruding member 21 and recessed portion 22.

In one embodiment, the lock mechanism 30 includes lock pin 31 disposed on cart 8 to be capable of advancing and retracting in the vehicle width direction, and striker 32 disposed on door body 3, and configured to be engaged and disengaged with lock pin 31. Accordingly, it is possible to simplify the structure of lock mechanism 30, and to facilitate the design.

In one embodiment, sensing means 33 includes engagement sensing pin 34 disposed to protruding member 21 to protrude in the axial direction, and configured to advance and retreat, and link mechanism 35 configured to convert the advance and retreat movement of engagement sensing pin 34 to the advance and retreat movement of lock pin 31. Accordingly, lock pin 31 is pulled from lock hole 32a of striker 32 by link mechanism 35 when engagement sensing pin 31 is retreated by abutting on the bottomed portion of recessed portion 22 by the engagement between protruding member 21 and recessed portion 22 at the door opening as described above. Consequently, it is possible to surely mechanically perform the lock releasing in synchronous with the engagement operation between protruding member 21 and recessed portion 22. In this way, sensing means 33 is constructed mechanically by engagement sensing pin 34 and link mechanism 35, and accordingly it is possible to simplify the structure, and to be advantageous to the cost.

In one embodiment, recessed portion 22 is provided in longitudinal wall 2a formed on the rear edge portion of vehicle body opening portion 2 to be inclined outwardly in the rearward direction, and accordingly it is possible to enhance the appearance since recessed portion 22 is not viewed from the outside of the vehicle. For the inclination surface, it is possible to effectively engage and hold both in the forward and rearward directions of the vehicle and in the width direction of the vehicle.

In one embodiment, the width of central arm 12 in the height direction of the vehicle is larger than that of the vehicle body side engagement portion. The arm is provided at a position to hide recessed portion 22 to overlap in the height direction of the vehicle, and accordingly the recessed portion is not exposed at the door opening operation. Therefore, it is possible to enhance the appearance and the safety such as the catching at the engagement.

In one embodiment, the arm according to this embodiment is disposed on a substantially central position of the door for improving the stability of supporting the door, and the engagement portion on the vehicle body side and the engagement portion on the arm side are configured to be engaged at this position. However, the engagement portions are not limited to this position, and for example, it is optional to provide the middle arm and another arm at a lower portion of the vehicle body opening portion, and to engage with this another arm.

[Second embodiment] In the following, a second embodiment according to the present invention will be illustrated by using FIGS. 7-15. Besides, the structure which is identical to the first embodiment mentioned above is designated by the same numerals, and their explanations are omitted by using the same symbol.

In the present embodiment, the vehicle body side engagement portion is a vehicle body side pin disposed on the edge portion on the door opening direction side of the opening portion of the vehicle body, and the arm side engagement portion is latch portions disposed on the cart of the arm.

As shown in FIG. 7, on door body 3 disposed on the outer side of the vehicle width direction, there is provided and fixed a rail 41 extending along the forward and rearward directions of the vehicle. Moreover, on the vehicle body, there is attached an arm 43 provided with a cart 42 at its end portion.

Figure 8:
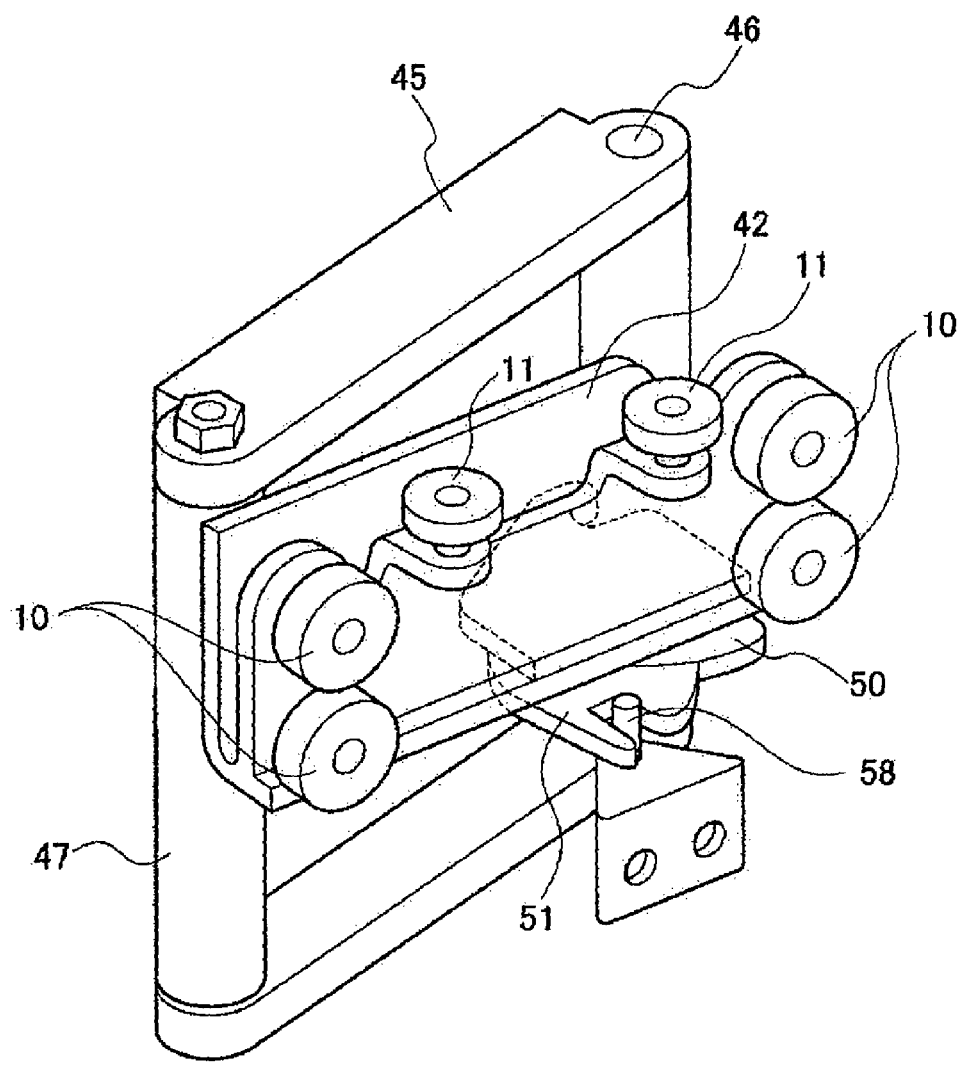
FIGS. 8 and 9 are perspective views of a cart portion of the sliding door structure shown in FIG. 7.

This arm 43 includes an arm body 45 rotatably supported by a bracket 44 (cf. FIG. 10) fixed to the vehicle body, cart 42 rotatably supported by the arm body 45; guide rollers 10 and 11 provided on the outer side of the vehicle width direction of cart 42; and first and second latch portions 50 and 51 mounted to a lower portion of cart 42, as shown in FIG. 8.

Figure 10:
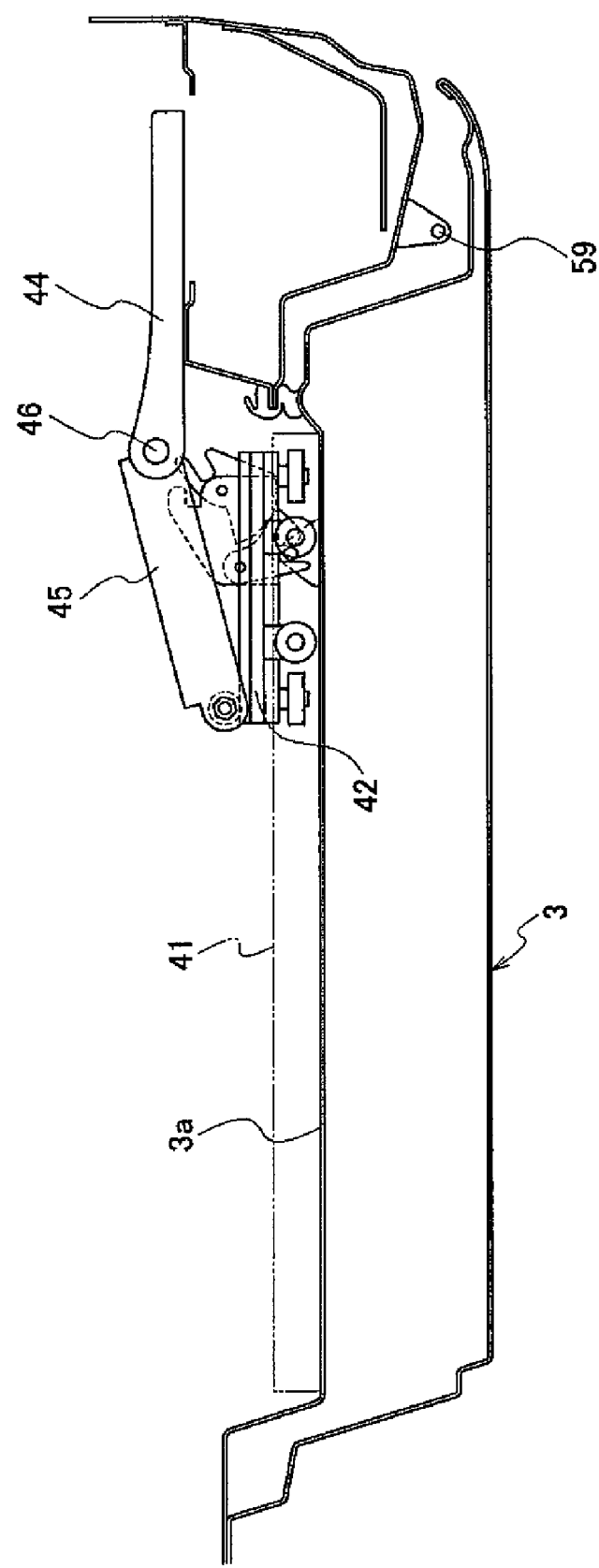
FIGS. 10 and 11 are top views of the sliding door structure shown in FIG. 7.

Bracket 44 is attached on the vehicle body along the forward and rearward directions of the vehicle, as shown in FIG. 10. Its vehicle forward end portion is rotatably supported through a pin 46 by a rear end portion of arm body 45.

Figure 9:
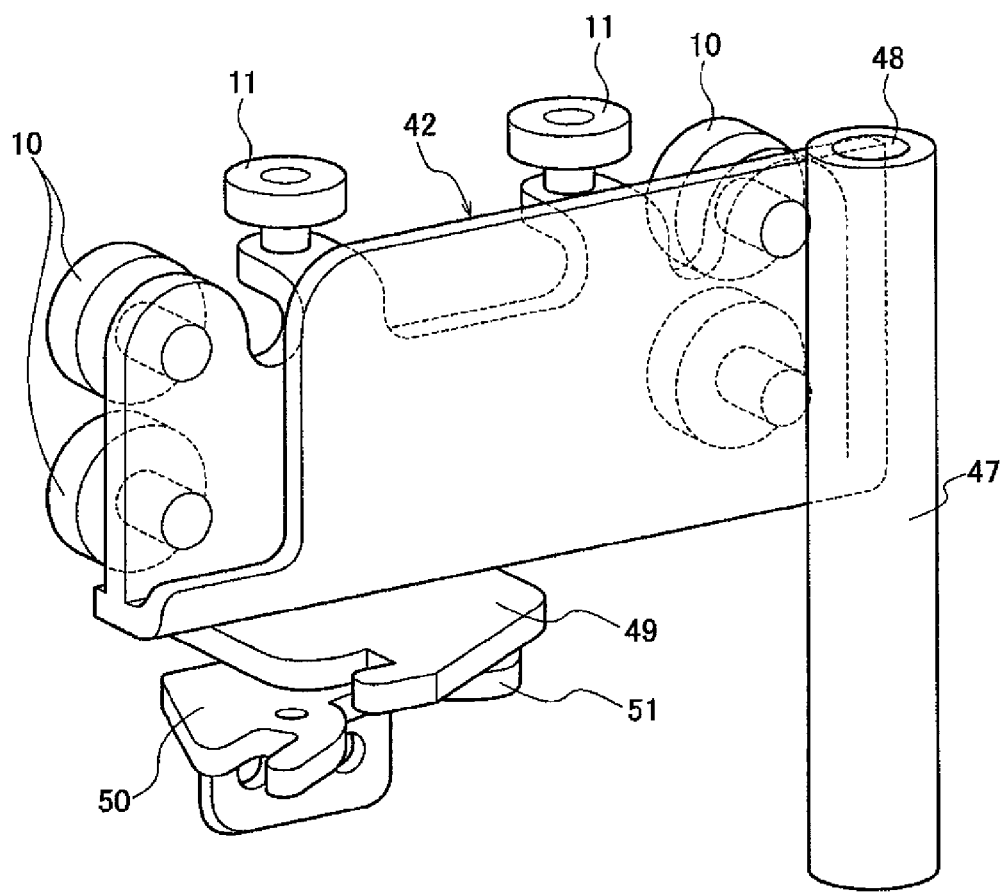

Moreover, a cylindrical support member 47 extending in the upward and downward directions is fixed to a forward end portion of arm body 45, as shown in FIGS. 8 and 9. A pin is inserted into an insertion hole 48 formed inside support member 47 to hold, and accordingly the forward end portion of cart 42 is rotatably supported on the forward end portion of arm body 45. Moreover, a pair of upper and lower longitudinal guide rollers 10 and 10 are rotatably supported at the forward end and the rearward end on the outer side of the vehicle width direction of cart 42. Horizontal guide rollers 11 and 11 are rotatably supported above these longitudinal guide rollers 10 and 10. A support bracket 49 is disposed and fixed on a lower portion of cart 42. First latch portion (first cam) 50 and second latch portion (second cam) 51 are rotatably supported on a lower portion of support bracket 49.

Figure 11:
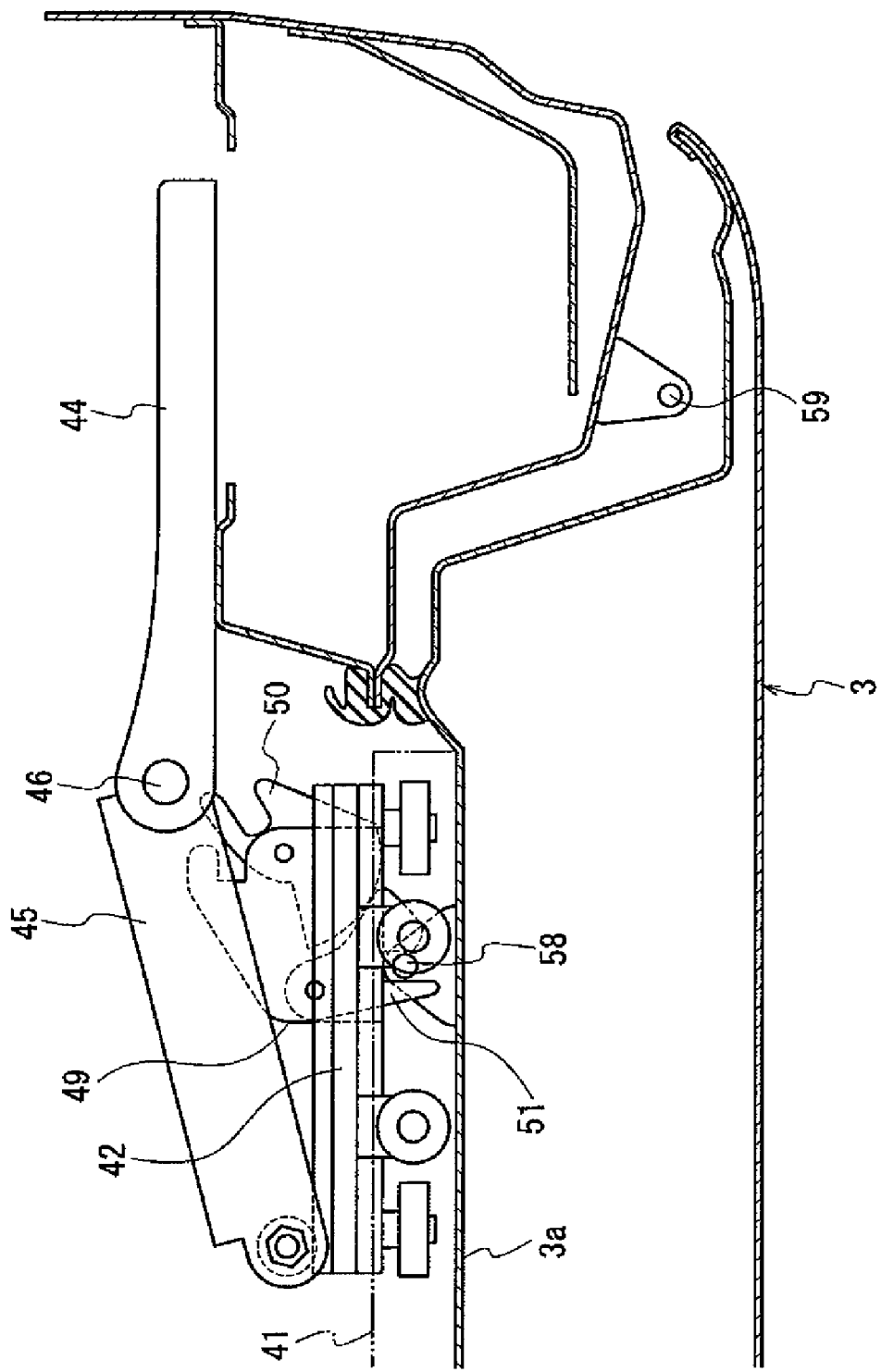
Figure 12A:
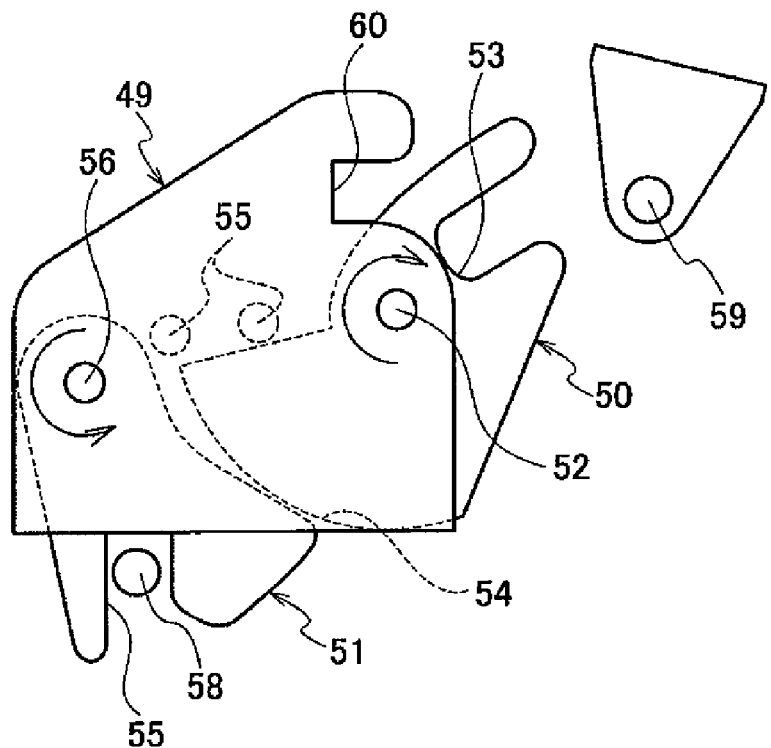
FIGS. 12-15 illustrate the actuation of cam portions of the sliding door structure shown in FIG. 7.
Figure 12B:
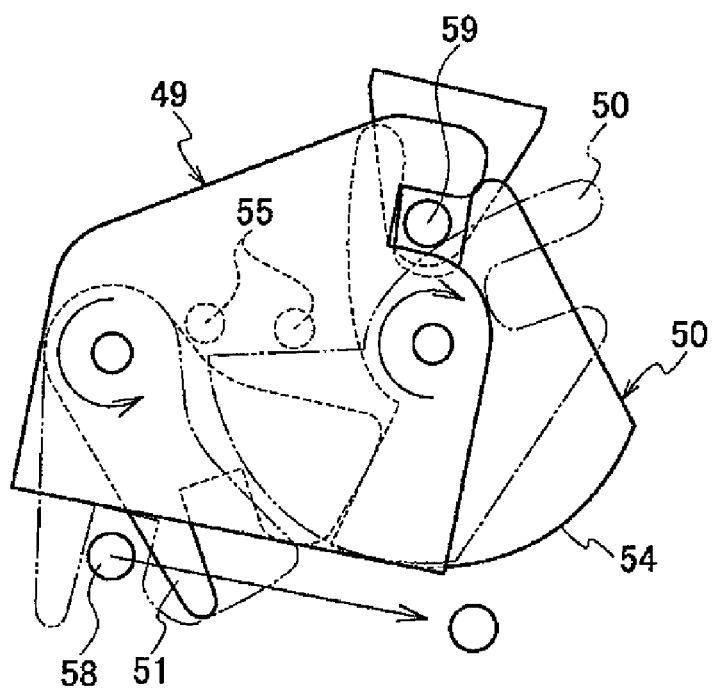

FIG. 11 is an enlarged sectional plan view of a main part of FIG. 10. FIG. 12 is a plan view showing a position relationship between the latch portion and the vehicle body side pin according to the second embodiment. FIG. 12A shows a state before the engagement of the latch portion with the vehicle body side pin, and FIG. 12B shows a state in which the latch portion is engaged with the vehicle body side pin.

Support bracket 49 is formed with a substantially rectangular cutaway 60 located at a rear end portion thereof. Cutaway 60 is configured to be engaged with vehicle body side pin 59.

First latch portion 50 and second latch portion 51 are disposed on the same plane at a lower portion of support bracket 49, as shown in FIG. 12A. First latch portion 50 is disposed on the rearward side of the vehicle relative to second latch portion 51.

A middle portion of first latch portion 50 is rotatably supported through a pin 52 on support bracket 49. First latch portion 50 is formed on one end side with a bifurcated engagement portion 53, and formed on the other end side with an arc portion 54. This engagement portion 53 is configured to be engaged with the vehicle body side pin 59. Moreover, first latch portion 50 is urged in directions of arrows shown in FIGS. 12A and 12B by a not-shown urging means. In a state before the engagement of engagement portion 53 with vehicle body side pin 59, first latch portion 50 is abutted on engagement pins 55 fixed to support bracket 49, and accordingly the rotation of first latch portion 50 is prevented.

One end side of second latch portion 51 is rotatably supported through a pin 56 by support bracket 49, and the other end side of second latch portion 51 is formed with a bifurcated engagement portion 55. This engagement portion 55 is configured to be engaged with a door side pin 58. Moreover, second latch portion 51 is urged in directions of arrows shown in the Figures by a not-shown urging means. Second latch portion 51 is engaged with arc portion 54 of first latch portion 50, and accordingly the rotation is prevented.

Next, in the second embodiment, the movement at the opening of door body 3, especially points different from the first embodiment will be briefly illustrated.

Figure 13:
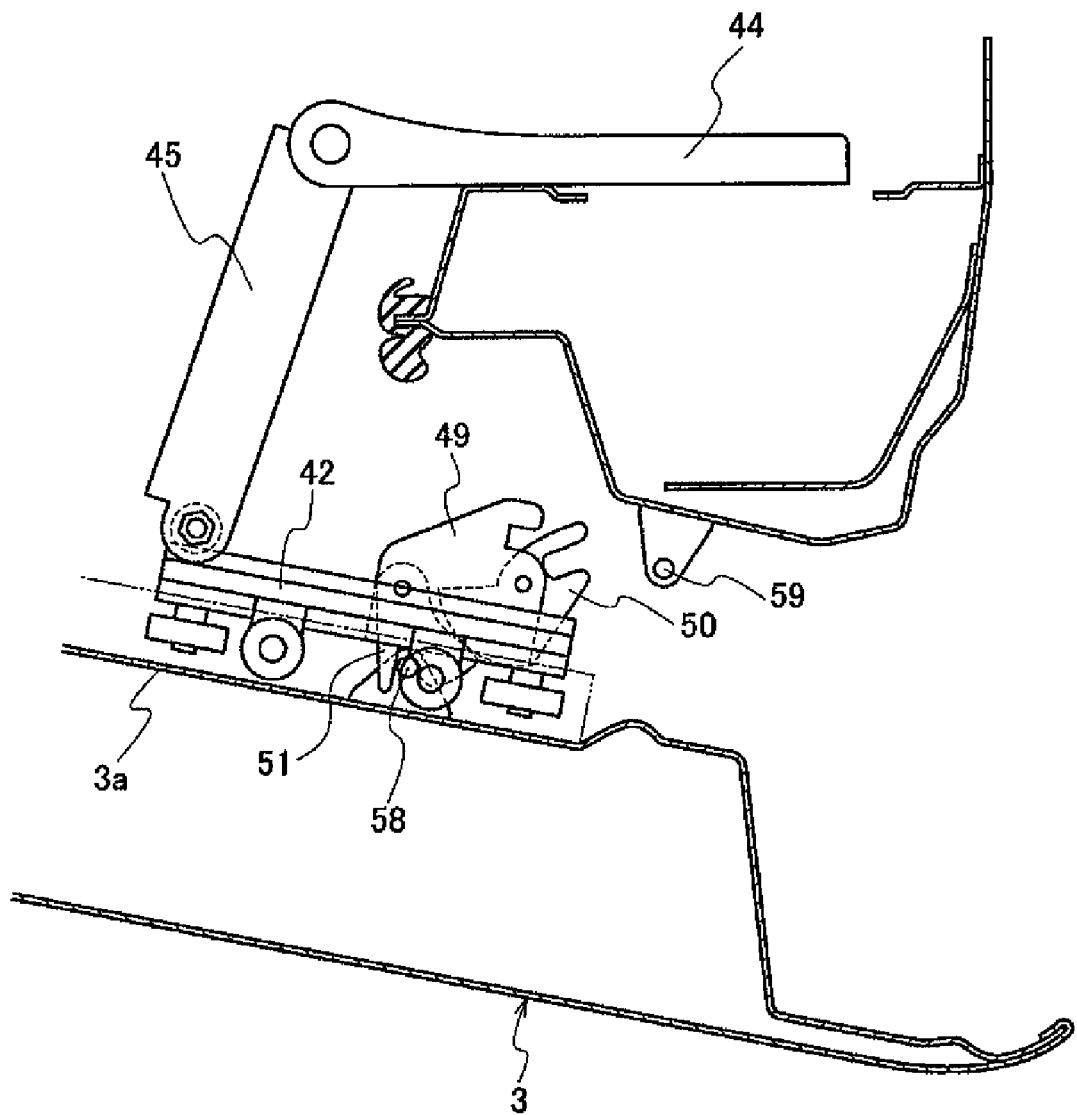

First, in a case in which door body 3 is opened as shown in FIG. 13, cart 42 is slid in the rearward direction of the vehicle in a state in which cart 42 is held by door body 3 and rail 41 for the engagement of second latch portion 51 with door side pin 58.

Figure 14:
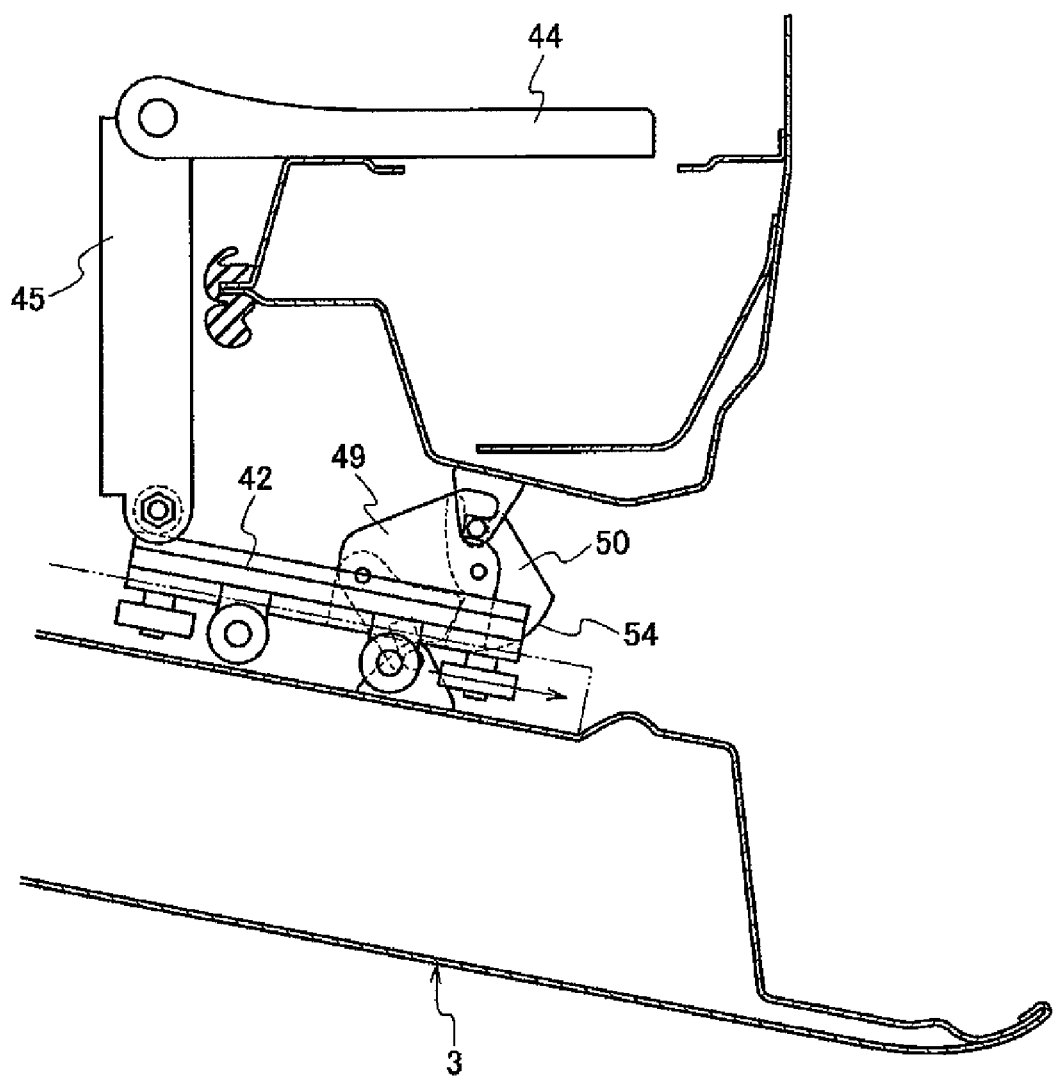
Figure 15:
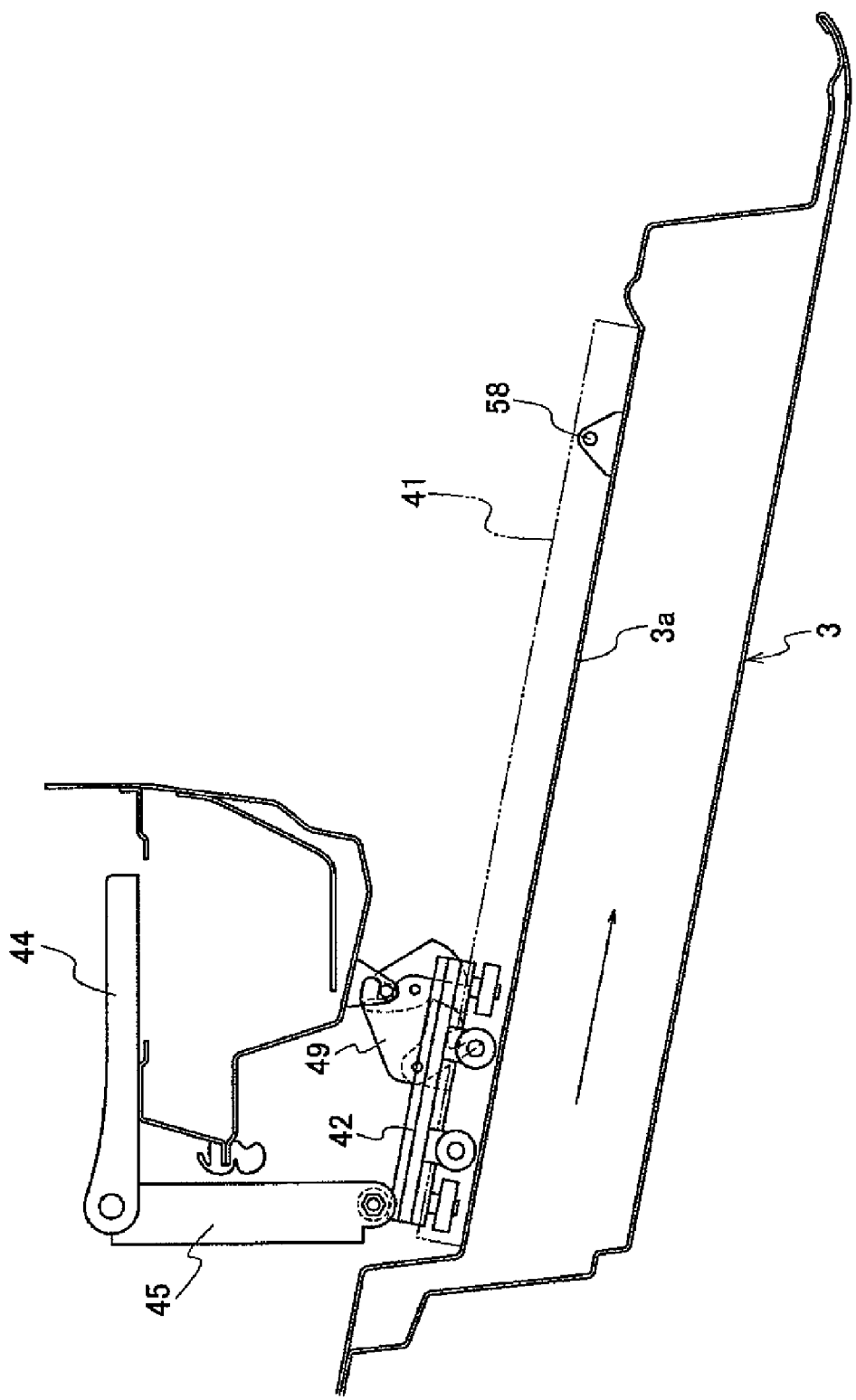

Next, in a case in which cutaway 60 of support bracket 49 and engagement portion 53 of first latch portion 50 are engaged with vehicle body side pin 59 as shown in FIG. 14, engagement portion 55 of second latch portion 51 is detached from door side pin 58. Second latch portion 51 is rotated along the urging direction because second latch portion 51 is urged. Consequently, cart 42 is fixed to vehicle body side pin 58, and door body 3 and rail 41 are moved relative to cart 42 in the rearward direction of the vehicle. Then, door body 3 is slid in the rearward direction, as shown in FIG. 15.

Hereinafter, operations and effects by the second embodiment will be illustrated.

The vehicle body side engagement portion is vehicle body side pin 59 disposed on the edge portion on the door opening direction side of opening portion 2 of the vehicle body. The arm side engagement portion is the latch portions (first latch portion 50 and second latch portion 51) disposed on cart 42 of arm 43. Therefore, it is possible to surely engage cart 42 of arm 43 to vehicle body side pin 59 by simple structure.

Moreover, door side pin 58 is disposed on door body 3, and latch portions 50 and 51 include first latch portion 50 rotatably supported on cart 42, and configured to be engaged with vehicle body side pin 59; and second latch portion 51 rotatably supported on cart 42, and configured to be engaged with door side pin 58. Accordingly, when door body 3 is opened, second latch portion 51 is engaged with door side pin 58 at the beginning of the opening, so as to hold cart 42 to door body 3. On the other hand, after first latch portion 50 is engaged with vehicle body side pin 59, it is possible to move door body 3 relative to cart 42 by releasing the engagement between second latch portion 51 and door side pin 58.

Moreover, near first latch portion 50, there is provided support bracket 49 configured to be engaged with vehicle body side pin 59. Both of first latch portion 50 and support bracket 49 are configured to be engaged with vehicle body side pin 59. Accordingly, it is possible to surely engage cart 42 to the vehicle body.

Besides, in the first and second embodiments, the sliding door provided with upper guide mechanism 4 is exemplified. However, it is optional to employ a sliding door configured to be slid by two guide mechanisms of lower guide mechanism 5 and middle guide mechanism 6, or only by middle guide mechanism 6. Moreover, it is optional to employ a sliding door configured to be opened in the forward direction of the vehicle.

Moreover, it is possible to use as lock mechanism 30, an electro-magnetic lock device configured to electromagnetically engage and disengage lock pin 31 to striker 32. In this case, it is possible to use as the sensing means, a switching member configured to electrically sense the engagement and the disengagement of engagement means 20.

It is to be understood that the invention is not limited to the illustrated and described forms of the invention contained herein. It will be apparent to those skilled in the art that various alterations and modification may be made without departing from the scope of the invention, and the invention is not considered limited to what is shown in the drawing and described in the specification. Accordingly, the scope of the invention should be limited only by the attached claims.

What is claimed is:

1. A sliding door structure of a vehicle for sliding a door body with respect to an opening portion of a vehicle body in a forward direction and a rearward direction of the vehicle body for opening and closing, the sliding door structure comprising:
    a rail disposed on the door body and aligned with the forward and rearward directions of the vehicle body; and
    an arm protruding from an edge portion on a rearward side of the opening portion of the vehicle body, and configured to engage with the rail to hold the door body movably in the forward and rearward directions,
    wherein the arm comprises a lock mechanism configured to lock the movement of the door body relative to the arm,
    wherein the arm is configured to rise and fall in a width direction of the vehicle and configured to push the door body outward beyond an outside plate of the vehicle body at a beginning of the opening of the door body,
    wherein the lock mechanism releases a lock between the door body and the arm when the door body moves to a predetermined position relative to the vehicle body during an opening operation of the door body, and
    wherein the lock mechanism comprises an arm side engagement portion configured to engage with a vehicle body side engagement portion disposed on a longitudinal wall of an edge portion on the rearward side of the opening portion of the vehicle body.

2. The sliding door structure of the vehicle according to claim 1, wherein the longitudinal wall is inclined in the door opening direction.

3. The sliding door structure of the vehicle according to claim 1, wherein a width of the arm in a height direction of the vehicle is larger than that of the vehicle body side engagement portion; and the arm is overlapped in the height direction of the vehicle to hide the vehicle body side engagement portion.

4. The sliding door structure of the vehicle according to claim 1, wherein the arm comprises a cart having a predetermined length in the forward and rearward directions, wherein the cart is configured to hold the door body by engaging the rail; and wherein the arm side engagement portion is disposed in the cart.

5. The sliding door structure of the vehicle according to claim 4, wherein the arm side engagement portion comprises a protruding member disposed in the cart, and wherein the vehicle body side engagement portion comprises a recessed portion disposed on the edge portion on the door opening direction side of the opening portion of the vehicle body and configured to be engaged and disengaged with the protruding member.

6. The sliding door structure of the vehicle according to claim 5, wherein the lock mechanism is configured to lock the cart to the door body in the closed state of the door body and to release the lock between the cart and the door body in response to a sensing means when the protruding member is engaged with the recessed portion at the opening of the door body.

7. The sliding door structure of the vehicle according to claim 6, wherein the lock mechanism comprises a lock pin disposed on the cart and configured to advance and retreat in the width direction of the vehicle, and a striker disposed on the door body and configured to engage and disengage with the lock pin.

8. The sliding door structure of the vehicle according to claim 6, wherein the sensing means comprises an engagement sensing pin disposed on the protruding member and configured to advance and retreat from an end of the protruding member, wherein the engagement sensing pin is configured to retreat by abutting on a bottomed portion of the recessed portion at the engagement of the protruding member with the recessed portion, and wherein a link mechanism is configured to convert advance and retreat movements of the engagement sensing pin to advance and retreat movements of the lock pin.

9. The sliding door structure of the vehicle according to claim 5, wherein the vehicle body side engagement portion comprises a vehicle body side pin and the arm side engagement portion comprises a latch portion disposed on the cart.

10. The sliding door structure of the vehicle according to claim 9, further comprising a door side pin disposed on the door body, wherein the latch portion comprises a first cam and a second cam, wherein the first cam is configured to rotate about a rotation axis aligned with the width direction of the vehicle and to engaged with the vehicle body side pin at the door opening, wherein the second cam is configured to restrict or release the rotation of the first cam and to rotate about an axis located at a different position from the rotation axis of the first cam.

11. The sliding door structure of the vehicle according to claim 10, wherein the first cam is configured to be urged in a direction opposite to the second cam.

12. The sliding door structure of the vehicle according to claim 11, wherein the second cam comprises a recessed portion configured to engage the door side pin, wherein the door body is unable to slide when the second cam is engaged with the door side pin, and wherein the door body is able to slide when the first cam is engaged with the vehicle body side pin after release of the engagement between the second cam.

13. The sliding door structure of the vehicle according to claim 10, further comprising:
   a bracket disposed near the first cam and configured to engage with the vehicle body side pin from the forward and rearward directions of the vehicle at the door opening.

14. A sliding door structure of a vehicle for sliding a door body with respect to an opening portion of a vehicle body in a forward direction and a rearward direction of the vehicle body for opening and closing, the sliding door structure comprising:
   sliding means disposed on the door body;
   arm connecting means for connecting between the sliding means,
   wherein the arm connecting means comprises a locking means configured to lock the movement of the door body relative to the arm connecting means,
   wherein the arm connecting means is configured to rise and fall in a width direction of the vehicle and to push the door body outward beyond an outside plate of the vehicle body at a beginning of the opening of the door body,
   wherein the locking means releases a lock between the door body and the arm connecting means when the door body moves to a predetermined position relative to the vehicle body during an opening operation of the door body, and
   wherein the locking means comprises an arm side engagement portion configured to engage with a vehicle body side engagement portion disposed on a longitudinal wall of an edge portion on the rearward side of the opening portion of the vehicle body.

15. The sliding door structure of the vehicle according to claim 14, wherein the longitudinal wall is inclined in the door opening direction.

16. The sliding door structure of the vehicle according to claim 14, wherein a width of the arm connecting means in a height direction of the vehicle is larger than that of the vehicle body side engagement portion; and the arm is overlapped in the height direction of the vehicle to hide the vehicle body side engagement portion.

17. The sliding door structure of the vehicle according to claim 14, wherein the arm connecting means comprises a cart having a predetermined length in the forward and rearward directions, wherein the cart is configured to hold the door body by engaging the sliding means; and wherein the arm side engagement portion is disposed in the cart.

18. A method of sliding a door body open with respect to an opening portion of a vehicle body in a forward direction and a rearward direction of the vehicle body for opening and closing, the method comprising:
   pushing the door body outwardly beyond an outside plate of the vehicle body before allowing sliding of the door body,
   wherein an arm is configured to rise and fall in a width direction of the vehicle;
   sliding the door body in an opening direction after the door body is pushed outwardly beyond the outside plate of the vehicle,
   wherein a locking means locks the movement of the door body relative to the arm; and
   the locking means releases the locked door body when the door body moves to a predetermined position relative to the vehicle body during an opening operation of the door body, and
   wherein the locking means comprises an arm side engagement portion configured to engage with a vehicle body side engagement portion disposed on a longitudinal wall of an edge portion on the rearward side of the opening portion of the vehicle body.

* * * * *